United States Patent
Tsuyuki et al.

(10) Patent No.: US 10,066,934 B2
(45) Date of Patent: Sep. 4, 2018

(54) THREE-DIMENSIONAL SHAPE MEASURING APPARATUS AND CONTROL METHOD THEREOF

(71) Applicant: CANON KABUSHIKI KAISHA, Tokyo (JP)

(72) Inventors: Motomi Tsuyuki, Yokohama (JP); Toshinori Ando, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 229 days.

(21) Appl. No.: 14/095,160

(22) Filed: Dec. 3, 2013

(65) Prior Publication Data

US 2014/0160243 A1    Jun. 12, 2014

(30) Foreign Application Priority Data

Dec. 12, 2012   (JP) ................... 2012-271775

(51) Int. Cl.
  *G01B 11/25* (2006.01)
  *H04N 5/235* (2006.01)
  (Continued)

(52) U.S. Cl.
  CPC ........ *G01B 11/254* (2013.01); *G01B 11/0608* (2013.01); *G01B 11/22* (2013.01);
  (Continued)

(58) Field of Classification Search
  CPC .. G01B 11/002; G06T 7/0065; H04N 13/0253
  See application file for complete search history.

(56) References Cited

U.S. PATENT DOCUMENTS 6,503,195 B1 *  1/2003  Keller ................ A61B 1/00163
                                                        348/45
7,977,625 B2   7/2011  Schwertner
                       (Continued)

FOREIGN PATENT DOCUMENTS

CN   101680749 A   3/2010
CN   101765755 A   6/2010
            (Continued)

OTHER PUBLICATIONS

Mar. 17, 2014 extended European Search Report concerning European Patent Application No. 13196610.3.
(Continued)

*Primary Examiner* — Zhubing Ren
(74) *Attorney, Agent, or Firm* — Fitzpatrick, Cella, Harper & Scinto

(57) ABSTRACT

An exposure amount of at least one or more first patterns used to determine positions at the time of triangulation is set to be larger than that of other patterns, so as to reduce the influence of shot noise in the first patterns, to improve precision, and to reduce power consumption as a whole. To this end, a three-dimensional shape measuring apparatus, which measures a three-dimensional shape of an object to be measured by projecting pattern light of a plurality of types of patterns onto the object to be measured, and capturing images of the object to be measured, controls a projector unit and image capture unit to set an exposure amount of the first patterns to be larger than that of patterns other than the first patterns.

15 Claims, 7 Drawing Sheets

(51) Int. Cl.
*G01B 11/06* (2006.01)
*G01B 11/22* (2006.01)
*G01B 11/24* (2006.01)
*G06T 7/50* (2017.01)

(52) U.S. Cl.
CPC .......... *G01B 11/2441* (2013.01); *G01B 11/25* (2013.01); *G01B 11/2531* (2013.01); *G06T 7/50* (2017.01); *H04N 5/2353* (2013.01)

(56) References Cited

U.S. PATENT DOCUMENTS

| | | | |
|---|---|---|---|
| 8,199,335 | B2 | 6/2012 | Mitsumoto et al. |
| 8,659,765 | B2 | 2/2014 | Ando |
| 8,708,497 | B2 | 4/2014 | Tsuyuki |
| 9,007,602 | B2 | 4/2015 | Takabayashi |
| 2009/0040532 | A1 | 2/2009 | Kawasaki et al. |
| 2009/0225333 | A1 | 9/2009 | Bendall et al. |
| 2010/0302364 | A1 | 12/2010 | Kim et al. |
| 2011/0080471 | A1* | 4/2011 | Song .................. G01B 11/245 348/46 |
| 2012/0051622 | A1* | 3/2012 | Gyoda .................. G03F 7/705 382/144 |
| 2012/0089364 | A1* | 4/2012 | Takabayashi ...... G01B 11/2527 702/167 |
| 2012/0287442 | A1 | 11/2012 | Tsuyuki |
| 2013/0141544 | A1 | 6/2013 | Tsuyuki |
| 2014/0104418 | A1 | 4/2014 | Ando |

FOREIGN PATENT DOCUMENTS

| | | |
|---|---|---|
| JP | 2002-131031 A | 5/2002 |
| JP | 2004-077290 A | 3/2004 |
| JP | 2004-226186 A | 8/2004 |
| JP | 2007-192608 A | 8/2007 |
| JP | 2009-019884 A | 1/2009 |
| JP | 2010-032448 A | 2/2010 |
| JP | 2011-133327 A | 7/2011 |
| JP | 2012-103239 A | 5/2012 |
| WO | 2004/109229 A | 12/2004 |

OTHER PUBLICATIONS

Feb. 1, 2016 Chinese Office Action corresponding to Chinese Patent Application No. 201310674771.4.

* cited by examiner

| CODE | OPTICAL CUTTING POSITION IDENTIFICATION PATTERN | | | | | | | | | | | | | | | |
|---|---|---|---|---|---|---|---|---|---|---|---|---|---|---|---|---|
| | OPTICAL CUTTING POSITION IDENTIFICATION/OPTICAL CUTTING POSITION DEFINITION PATTERN | PATTERN A | 0 | 0 | 0 | 0 | 0 | 0 | 0 | 0 | 1 | 1 | 1 | 1 | 1 | 1 | 1 |
| | | PATTERN B | 0 | 0 | 0 | 0 | 1 | 1 | 1 | 1 | 0 | 0 | 0 | 0 | 1 | 1 | 1 |
| | | PATTERN C | 0 | 0 | 1 | 1 | 0 | 0 | 1 | 1 | 0 | 0 | 1 | 1 | 0 | 0 | 1 |
| | | PATTERN D | 0 | 1 | 0 | 1 | 0 | 1 | 0 | 1 | 0 | 1 | 0 | 1 | 0 | 1 | 1 |
| CODE VALUE | | | 0 | 1 | 2 | 3 | 4 | 5 | 6 | 7 | 8 | 9 | 10 | 11 | 12 | 13 | 14 | 15 |

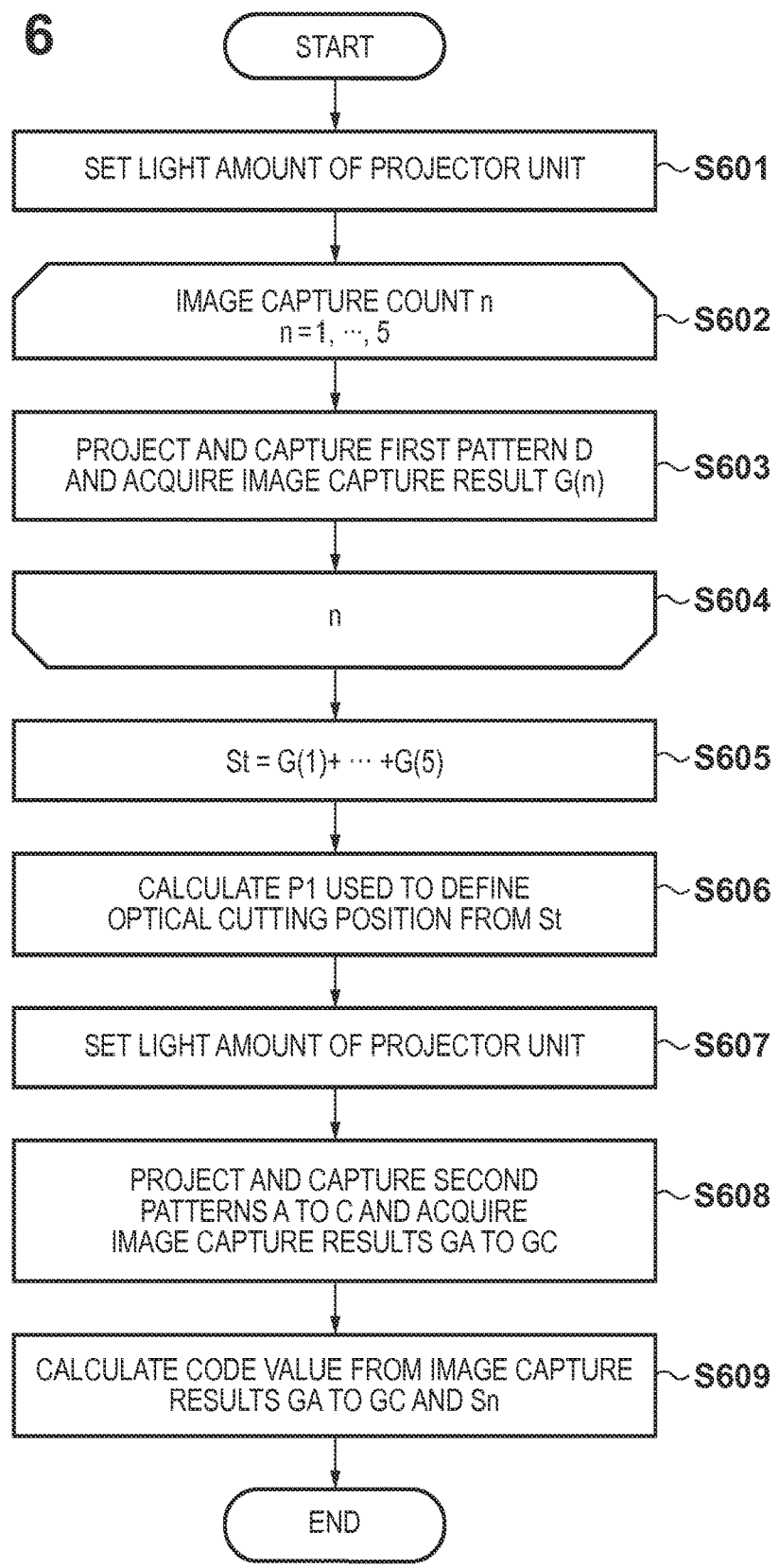

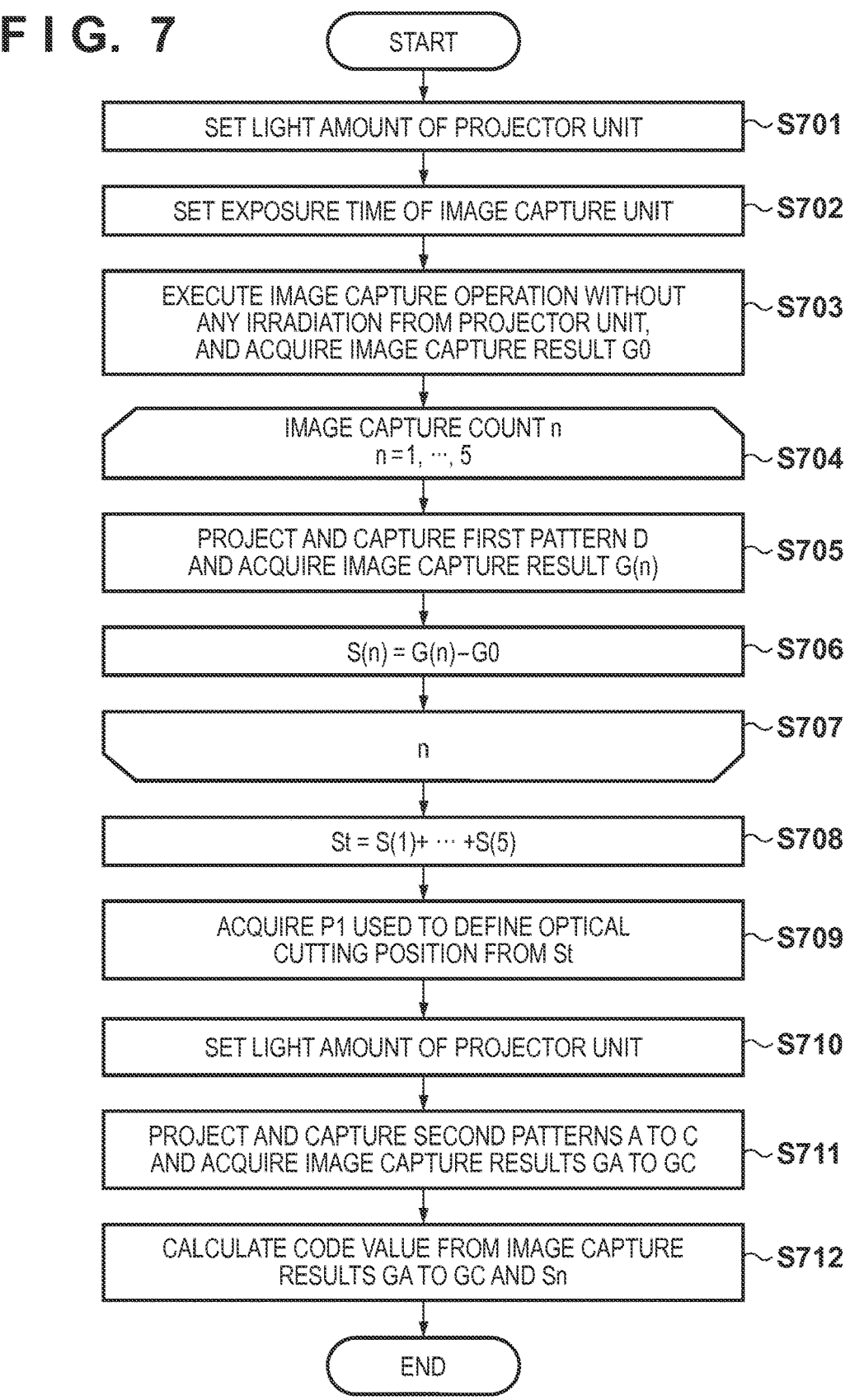

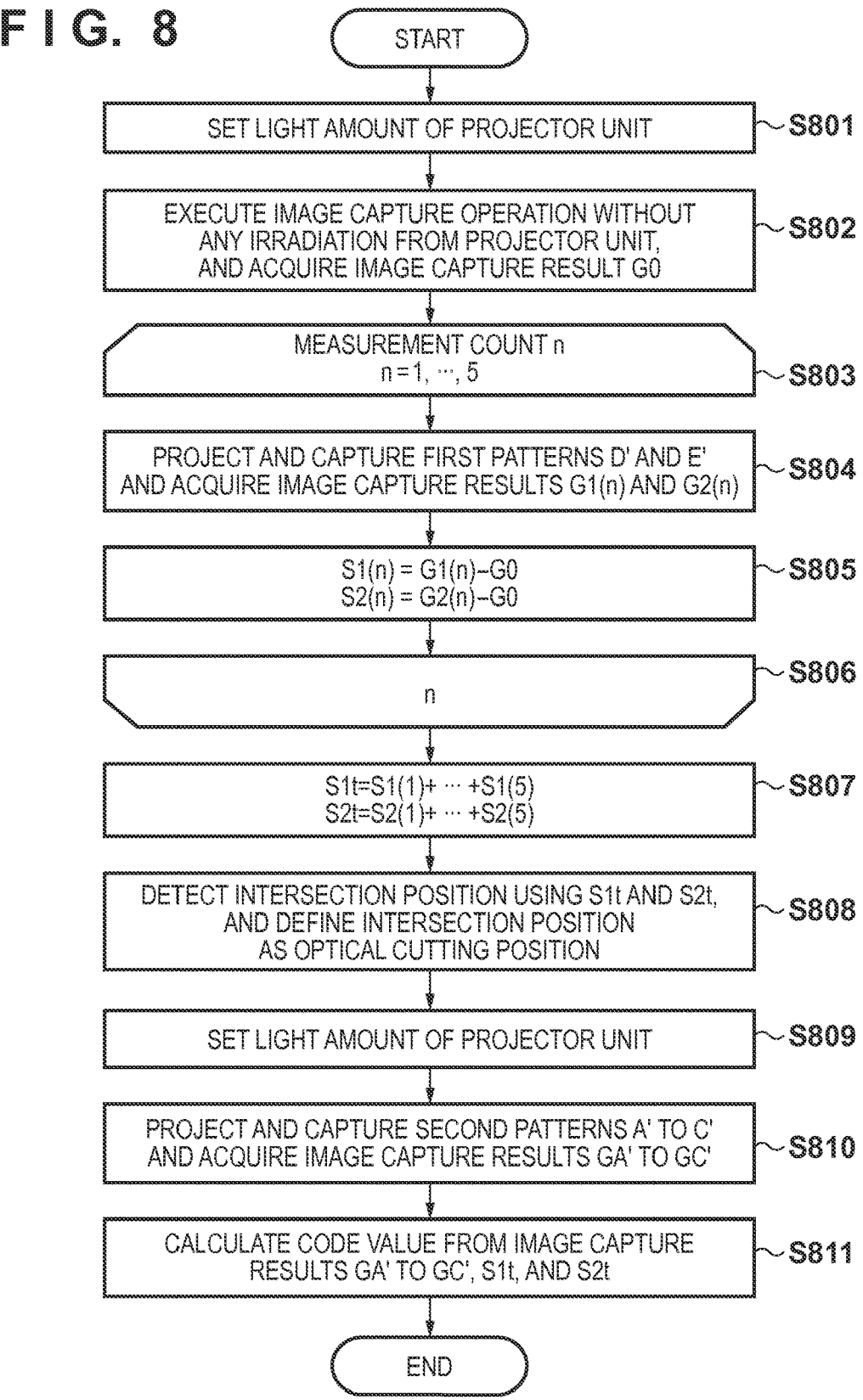

THREE-DIMENSIONAL SHAPE MEASURING APPARATUS AND CONTROL METHOD THEREOF

BACKGROUND OF THE INVENTION

Field of the Invention

The present invention relates to a three-dimensional shape measuring apparatus and a control method thereof which acquires three-dimensional shape data of an object to be measured by projecting pattern light onto the object to be measured, and capturing an image of the object.

Description of the Related Art

A three-dimensional measuring apparatus, which acquires three-dimensional shape data of an object to be measured by providing a projector apparatus and capture apparatus in a given relationship, projecting a plurality of pattern light beams from the projector apparatus onto the object to be measured, and capturing an image of the object to be measured by the capture apparatus every time the pattern light is projected, is known.

For example, Japanese Patent Laid-Open No. 2007-192608 (to be referred to as a literature hereinafter) discloses a technique for acquiring three-dimensional shape information of an object to be measured by projecting a plurality of binary patterns onto the object to be measured so as to code a three-dimensional space.

When light enters a photodetection element such as a CCD image sensor used in an image capturing device, a signal according to a light intensity is obtained, and unavoidable shot noise is typically generated at the same time. This shot noise influences the precision of position detection of a pattern. Especially, when an intensity of light which enters the image capturing device is weak, since the shot noise is large relative to the light intensity, an S/N ratio drops, thus lowering the position detection precision of a pattern to be detected.

By increasing an exposure amount on the image capturing device when an image is captured, the influence of this shot noise is lightened, and the position detection precision can be improved. However, in a three-dimensional shape measurement which projects a plurality of patterns, when an increase in exposure amount on the image capturing device is adjusted based on a light source luminance level on the projection side, electric power increases unwantedly. When the increase in exposure amount is adjusted based on an exposure time when an image is captured, it takes time until shape measurement, thus posing a problem.

SUMMARY OF THE INVENTION

The invention, in one aspect, provides an apparatus comprising: a projection unit configured to project a plurality of projection patterns to measure a three-dimensional shape of an object to be measured; an image capture unit configured to capture images of the object to be measured on which the plurality of projection patterns are projected by the projection unit; a control unit configured to set a larger exposure amount when one or more first projection patterns of the plurality of types of projection patterns is captured than an exposure amount when projection patterns other than the one or more first projection pattern are captured; and a derivation unit configured to derive a three-dimensional shape of the object to be measured based on the images captured by the image capture unit.

The invention, in a second aspect provides a method of controlling an apparatus having a projection unit configured to project a plurality of projection patterns required to measure a three-dimensional shape of an object to be measured and an image capture unit configured to capture images of the object to be measured on which the plurality of projection patterns are projected by the projection unit, the method comprising: a control step of setting a larger exposure amount when one or more first projection patterns of the plurality of types of projection patterns is captured than an exposure amount when projection patterns other than the one or more first projection patterns are captured; and a derivation step of deriving a three-dimensional shape of the object to be measured based on the images captured by the image capture unit.

According to embodiments of the invention, in at least one or more first patterns, which determine a position at the time of triangulation, an exposure amount is set to be larger than other patterns so as to reduce the influence of shot noise in the first patterns, to improve the precision, and also to reduce power consumption as a whole.

Further features of the present invention will become apparent from the following description of exemplary embodiments (with reference to the attached drawings).

BRIEF DESCRIPTION OF THE DRAWINGS

FIG. 6 is a flowchart showing the processing sequence according to the second embodiment;

FIG. 7 is a flowchart showing the processing sequence according to the third embodiment; and FIG. 8 is a flowchart showing the processing sequence according to the fourth embodiment.

DESCRIPTION OF THE EMBODIMENTS

Embodiments according to the present invention will be described in detail hereinafter with reference to the accompanying drawings.

Figure 1:
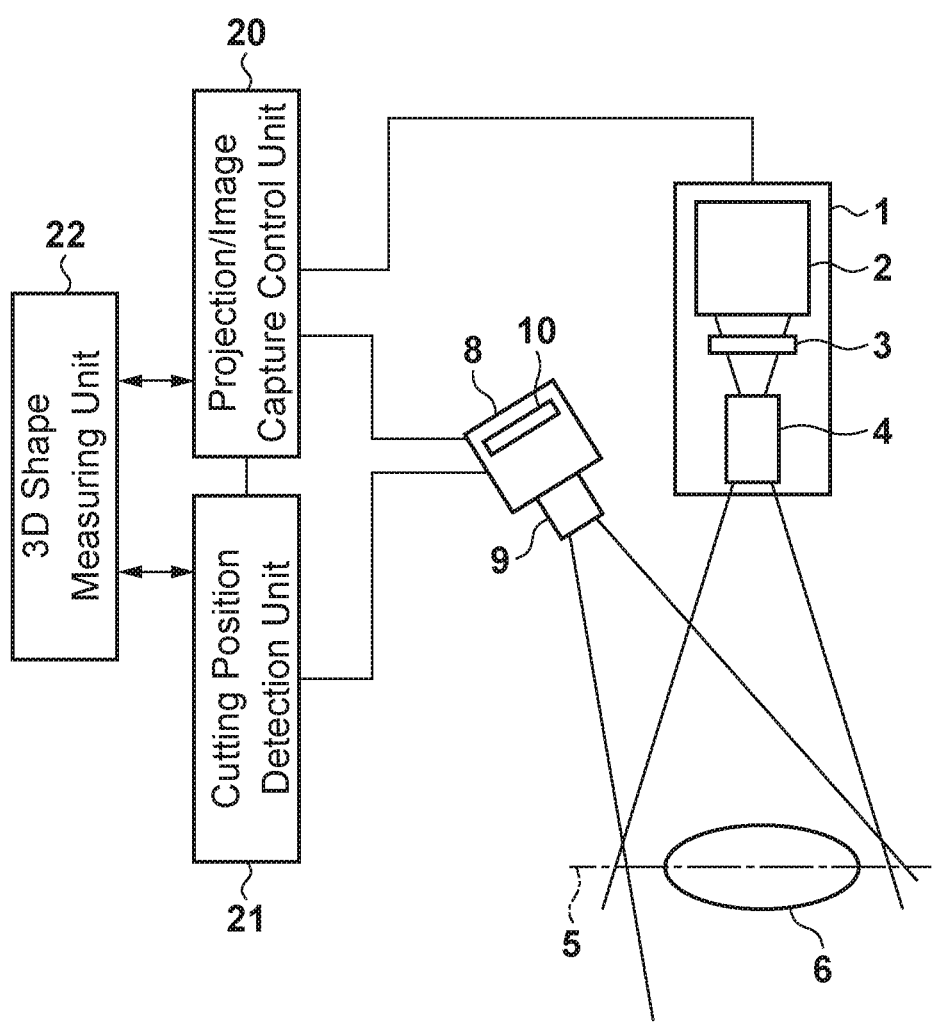
FIG. 1 is a view showing the arrangement of a three-dimensional shape measuring apparatus according to an embodiment.

FIG. 1 shows the arrangement of a three-dimensional shape measuring apparatus according to this embodiment. The apparatus includes a projector unit 1, image capture unit 8, projection/image capture control unit 20, optical cutting position detection unit 21, and three-dimensional shape measuring unit 22.

The projector unit 1 includes a liquid crystal panel 3, a lighting unit 2 which lights the liquid crystal panel 3, and a projection optical system 4 which projects an image of the liquid crystal panel 3 on an object 6 to be measured disposed in the vicinity of a surface 5 to be detected. The projector unit 1 projects a predetermined pattern onto the object 6 to be measured via the liquid crystal panel 3 while adjusting a light amount at a projection timing in accordance with an instruction from the projection/image capture control unit 20. For example, the light amount may be adjusted by a light source luminance level of the projector unit 1, and may be adjusted by a projecting time of the projector unit 1.

The image capture unit 8 includes an image capturing device 10, and an image capturing optical system 9 which caused a pattern to be projected onto the object 6 to be measured on the image capturing device 10 as a luminance distribution, and causes the image capturing device 10 to capture an image of the object 6. Then, the image capture unit 8 executes an image capture operation while adjusting an exposure time at an image capturing timing according to an instruction from the projection/image capture control unit 20, and outputs the luminance distribution on the image capturing device as a tone distribution discretely sampled by the image capturing device to the optical cutting position detection unit 21. In the present specification, a position of pattern light in an image used in triangulation will be referred to as an optical cutting position.

The projection/image capture control unit 20 controls the overall apparatus. That is, the projection/image capture control unit 20 controls the projector unit 1 to project a predetermined pattern onto the object to be measured at a predetermined timing, and controls the image capture unit 8 to capture the pattern on the object to be measured. Also, the projection/image capture control unit 20 includes a memory which holds pattern data indicating exposure patterns to be described later.

The three-dimensional shape measuring apparatus according to this embodiment is disposed under environmental lighting (not shown). Therefore, a luminance distribution by this environmental lighting is added to a projection pattern to be projected onto the object to be measured. The projector unit 1 projects at least two types of patterns, the image capture unit 8 captures images corresponding to the respective patterns, and the optical cutting position detection unit 21 detects an optical cutting position from the captured images.

Figures 2, 3:
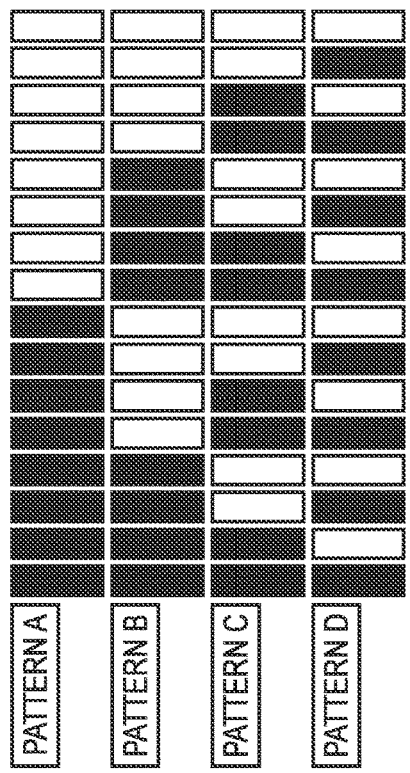
FIG. 2 is a view showing patterns used in the first embodiment.
FIG. 3 is a table showing coding of captured patterns.

In this embodiment, a plurality of types of patterns are used in detection of an optical cutting position. In this case, four types of patterns A to D shown in FIG. 2 are used as a practical example. The respective patterns shown in FIG. 2 are also those which indicate bright and dark liquid crystal pixels on the liquid crystal panel 3 of the projector unit 1. Assume that a white portion is that which transmits light through it (a portion which lights up a surface of the object to be measured), and a black portion is a light-shielding portion. As shown in FIG. 2, line widths of bright and dark sections of the pattern D are smaller than those of the patterns A to C.

In the first embodiment, the patterns A to D shown in FIG. 2 are used to identify an optical cutting position, and especially, the pattern D is also used to define the optical cutting position. Note that one or more patterns of the patterns A to C shown in FIG. 2 represent a second pattern of the present invention, and the pattern D represents a first pattern of the present invention.

Identification and definition of an optical cutting position in this embodiment will be described below.

As described above, the pattern D having the smallest line widths of bright and dark sections, as shown in FIG. 2, is used not only to identify an optical cutting position, but also to define the optical cutting position. Thus, an example of an optical cutting position definition method using the pattern D will be described below.

Figure 4:
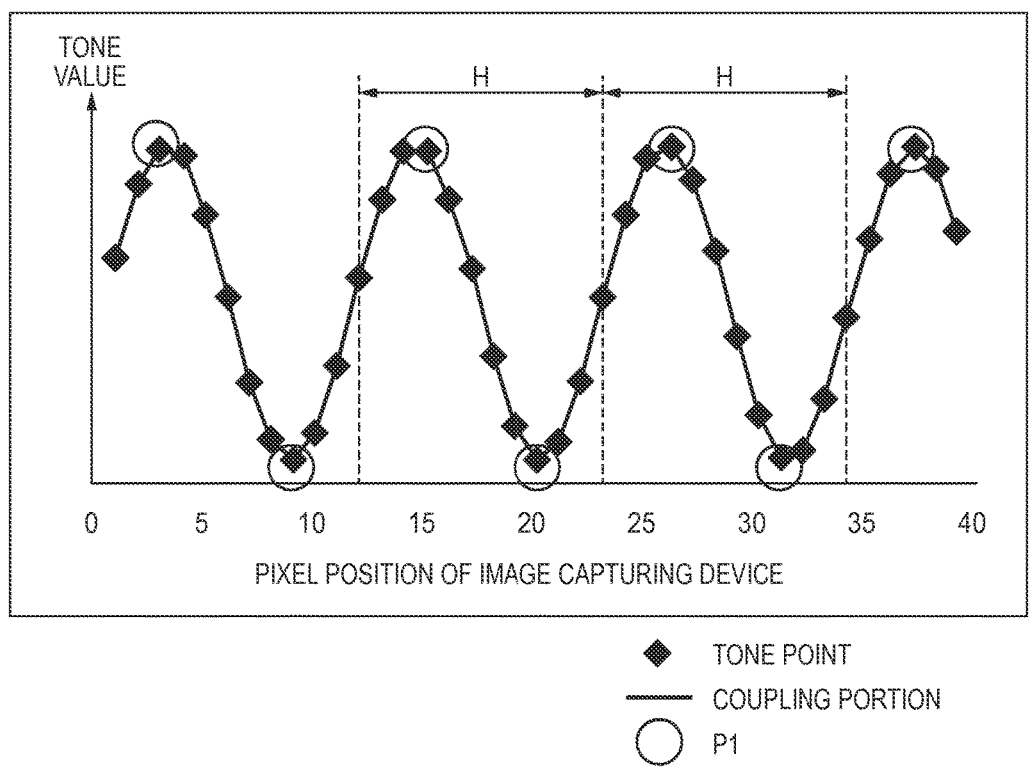
FIG. 4 is a graph showing tone values acquired from image data obtained by capturing a pattern D.

When the projector unit 1 projects pattern light corresponding to the pattern D onto the object to be measured, and the image capture unit 8 captures an image, a tone distribution shown in FIG. 4, which is discretely sampled by the image capturing device, can be acquired. The abscissa of FIG. 4 plots a pixel position of the image capturing device, and the ordinate plots a tone value (luminance value).

Points, which correspond to a tone point having a highest tone value and that having a lowest tone value during one bright-dark cycle H of the sampled pattern, are represented by P1, and positions of these points P1 are defined as optical cutting positions in this embodiment. Note that a pattern and method used to define an optical cutting position are not limited to them.

Identification of an optical cutting position will be described below. The patterns A, B, and C used to identify an optical cutting position are projected and captured, thus acquiring respective captured images. At the optical cutting positions defined by the captured image of the aforementioned pattern D, bright and dark levels of luminance values of the captured images of the captured patterns A to C are binarized to "1" and "0", as shown in FIG. 3. For example, a bright section is "1", and a dark section is "0".

From tone values at the optical cutting positions defined based on the captured image of the pattern D, bright and dark levels of the captured pattern D are similarly binarized. Then, decimal code values used to identify the optical cutting positions are decided from the binary values of the patterns A to D.

Note that the code values used to identify the optical cutting positions are decided using the four types of patterns in the embodiment, but the number of patterns to be projected may be changed depending on the measuring situation.

In FIG. 2, a pattern of one type includes bright and dark sections having an equal width. However, using another method such as a gray code, the pattern of one type may include bright and dark sections having different line widths. Since the gray code is a well-known method, a detailed description thereof will not be given. The number of code values changes depending on a change in the number of patterns and that in line width of bright and dark sections in a pattern. In the example of FIG. 3, the code values are expressed by decimal values, but they may be calculated as binary values or using the gray code or the like.

The three-dimensional shape measuring unit 22 measures three-dimensional coordinate values of the respective optical cutting positions by the principle of triangulation based on the optical cutting positions defined by the optical cutting position detection unit 21 and the identified code values.

Note that when the acquired image capture result of the pattern D includes shot noise or outside-light components in an environment, errors are generated in the optical cutting positions to be defined.

When errors are generated in the defined optical cutting positions, the optical cutting positions have to be defined after factors of shot noise and disturbance light are reduced from the image capture result of the pattern D.

However, the patterns A to C are used only to decide the code values, since binary values "1" and "0" need only be identified from bright and dark density levels of each pattern as the image capture result. Hence, even when the image capture result includes shot noise, disturbance components, and the like, it does not impose any influence on the detection precision of the three-dimensional shape measurement. That is, even when the image capture results of the patterns used to identify the optical cutting positions include noise components, no serious problem is posed. However, as the image capture result of the pattern D required to define the optical cutting positions, that which does not include noise components and the like is desirable.

In this embodiment, a method of reducing factors of shot noise from the image capture result of the pattern D will be described in detail below with reference to the flowchart shown in FIG. 5.

In step S501, a projection light amount of the pattern D used to define optical cutting positions is set (or adjusted). In step S502, the projector unit 1 projects the pattern as a first pattern, on which bright and dark sections are alternately disposed, onto the object 6 to be measured. Then, the image capture unit 8 captures an image of the object 6 to be measured on which the pattern D is projected to acquire an image capture result G1. Then, points P1 which define the optical cutting positions, as shown in FIG. 4, are calculated form the image capture result G1.

In step S503, a light amount used upon projection of the pattern used to identify the optical cutting positions is set.

The image capture result of the pattern used to identify the optical cutting positions has a smaller influence on the three-dimensional shape measurement precision even when it includes noise components more than the image capture result used to define the optical cutting positions. Hence, the light amount is adjusted to be smaller than that set in step S501.

In step S504, the projector unit 1 sequentially projects the patterns A to C as second patterns, on which bright and dark sections are alternately disposed, onto the object 6 to be measured. Then, the image capture unit 8 captures images of the object 6 to be measured on which the patterns A to C are projected, thus acquiring image capture results G2 to G4.

Finally, in step S505, code values are calculated using the image capture results G1 to G4.

When the patterns used to identify the optical cutting positions are to be projected as in this embodiment, the light amount of the projector unit is decreased in turn reducing that which enters the image capturing device, thus suppressing electric power at a projection timing.

In this embodiment, only three types of patterns are used to identify the optical cutting positions. However, the number of patterns may be greatly increased depending on a measuring range and measuring conditions. In such a case, an effect of saving wasteful electric power is very large. In this embodiment, an exposure amount which enters the image capturing device is adjusted by adjusting the light amount of the projector unit. Alternatively, for example, steps S501 and S504 may be executed to "set an exposure time of the image capture unit", that is, an exposure amount which enters the image capturing device can be adjusted by adjusting an exposure time of the image capture unit.

When the light amount, which enters the image capturing device, is reduced by decreasing the exposure time of the image capture unit, the exposure time required to capture an image can be shortened in all types of patterns used to identify the optical cutting positions, thus shortening a time required until detection of the three-dimensional shape measurement. Especially, when the exposure time required to capture an image is shortened, a time until detection of the three-dimensional shape measurement can be greatly shortened when the number of patterns which are to undergo projection/image capture operations required to identify the optical cutting position is increased.

In this manner, in case of projection/image capture operations of the patterns used to identify the optical cutting positions, the light amount, which enters the image capturing device, is decreased, and in case of the pattern used to define the optical cutting positions, the light amount is increased, thereby reducing shot noise only from the required pattern, and precisely detecting the three-dimensional shape measurement.

Figure 5:
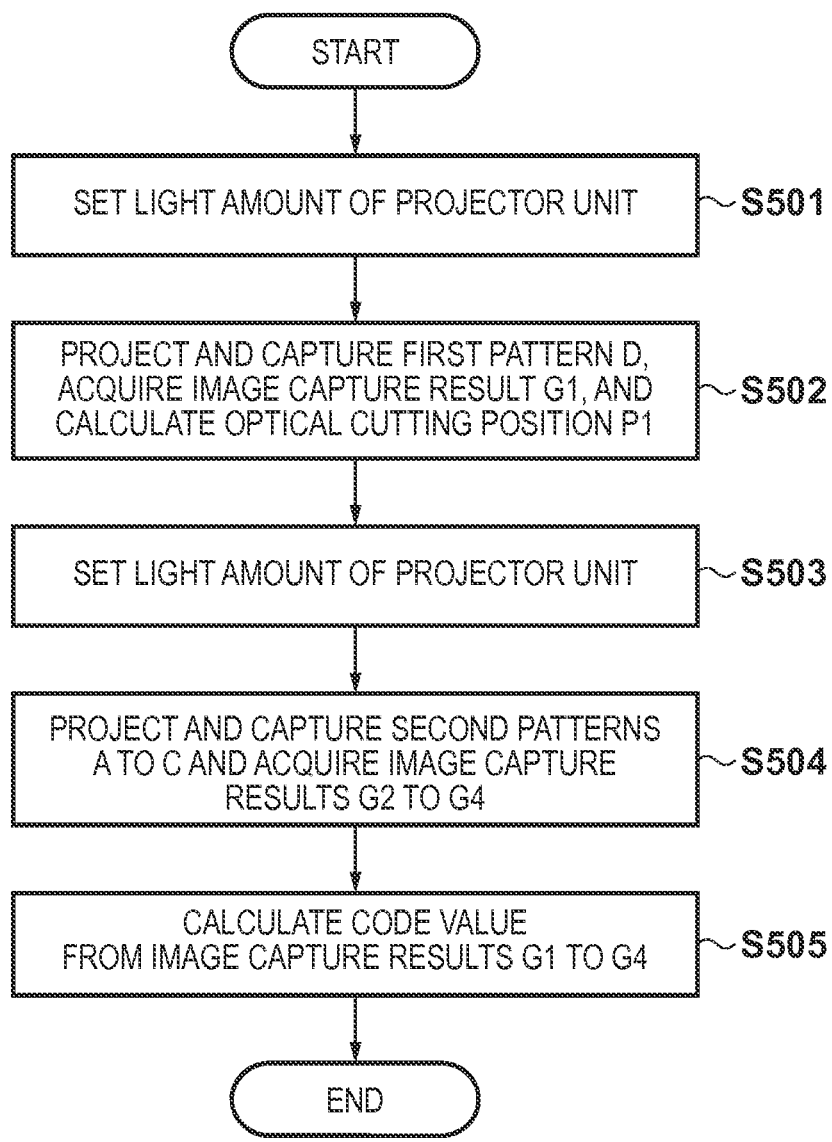
FIG. 5 is a flowchart showing the processing sequence according to the first embodiment.

In the flowchart shown in FIG. 5, after the projection/image capture operation of the pattern D used to define the optical cutting positions, those of the patterns used to identify the optical cutting positions are executed. However, an order of measuring patterns may be reversed as long as features of this embodiment are satisfied.

Second Embodiment

A method of reducing shot noise by integrating image capture results of a pattern D, which is captured a plurality of times will be described below as the second embodiment with reference to the flowchart shown in FIG. 6. Note that the apparatus arrangement is the same as that of the first embodiment, and a description thereof will not be repeated.

In step S601, a light amount upon projection of the pattern D used to define optical cutting positions is set.

In steps S602 to S604, an image capture operation of the pattern used to define the optical cutting positions is repeated five times. In step S603, the pattern D is projected onto an object 6 to be measured, and an image capture unit 8 captures the object 6 to be measured on which the pattern D is projected five times to acquire image capture results G(1) to G(5).

Then, in step S605, a combined result St of the image capture results G(1) to G(5) of the five image capture operations is calculated.

In step S606, points P1 used to define the optical cutting positions are calculated from the combined result St.

Since shot noise is statistically randomly generated, a generation amount changes every time each of a plurality of image capture operations is executed. For this reason, by combining a plurality of image capture results of the pattern D, the influence of shot noise can be reduced with respect to the combined light intensity. Thus, using the combined result St, the optical cutting positions can be precisely defined.

Since steps S607 to S609 are the same as steps S503 to S505 in FIG. 5, a description thereof will not be repeated.

In the aforementioned second embodiment, an exposure amount which enters an image capturing device is adjusted by adjusting a light amount of a projector unit. Alternatively, for example, an exposure time of an image capture unit may be set in step S601, and the exposure time of the image capture unit may be adjusted to be decreased in step S606. That is, the exposure amount may be adjusted using the exposure time.

In step S607, the light amount, which enters the image capturing device when patterns A to C are projected to capture images, is set to be decreased with respect to that, which enters the image capturing device when the pattern D is projected to capture an image. In the second embodiment in which a plurality of image capture results are combined, step S607 may be omitted depending on the measuring situation.

In the second embodiment, the number of times of image capture operations in the projection/image capture operations of the pattern D is set to be five. However, the number of times of measurement can be 2 or more, and may be changed depending on the situation. Furthermore, the number of times of image capture operations may be automatically set so that the result St may be calculated for each image capture operation, and the projection/image capture operation is repeated until a result S(t) exceeds a certain intensity.

Third Embodiment

An example in which disturbance light is removed from an image capture result of a pattern D, and a plurality of image capture results are combined to reduce shot noise will be described as the third embodiment with reference to the flowchart shown in FIG. 7. Note that the apparatus arrangement is the same as that of the first embodiment, and a description thereof will not be repeated.

A light amount to be projected is set in step S701, and an image capture time of an image capture unit is set in step S702.

Next, in step S703, a projector unit is set in an inactive state to capture an image of an object to be measured, thus acquiring an image capture result G0 of outside-light components alone.

In steps S704 to S707, an image capture operation of the pattern D used to define optical cutting positions is repeated a plurality of times (five times in this embodiment). In step S705, the pattern D is projected onto an object 6 to be measured, and an image capture unit 8 captures the object 6 to be measured on which the pattern D is projected five times, thus acquiring image capture results G(1) to G(5).

Then, in step S706, the disturbance light components G0 are subtracted from the image capture results G(1) to G(5) of the plurality of image capture operations, thereby calculating results S(1) to S(5) in which the disturbance light components are removed.

In step S708, the results S(1) to S(5) in which the disturbance light components are removed are combined to calculate a result St. Since subsequent steps S709 to S712 are the same as steps S606 to S609 in FIG. 6, a description thereof will not be repeated.

As described above, by combining the plurality of image capture results of the pattern D in which disturbance light components are removed, the result St in which noise components of disturbance light are removed and the influence of shot noise with respect to a light intensity is reduced can be calculated, thus defining the optical cutting positions with increased accuracy.

When it is difficult to identify optical cutting positions due to many noise components of acquired image capture results GA to GC if a light amount, which enters an image capturing device upon capturing images of patterns used to identify optical cutting positions, is decreased in step S710, step S710 may be omitted depending on the measurement situation.

On the other hand, when outside-light components are largely unevenly generated depending on positions on a surface to be measured, such outside-light unevenness may significantly affect the image capture results of the patterns used to identify the optical cutting position, and it may be difficult to calculate code values.

At this time, after the disturbance light components G0 are subtracted from the results GA to GC, code values are calculated to solve such problem, although not shown in the flowchart of FIG. 7.

In the third embodiment, the number of times of image capture operations in the projection/image capture operations of the pattern D is set to be five. However, the number of times of measurement can be 2 or more, and may be changed depending on the situation. The patterns and method used to define and identify the optical cutting positions are not limited to them.

Fourth Embodiment

A method of detecting intersection positions from image capture results of two types of bright-dark patterns, and defining the intersection positions as optical cutting positions will be described below as the fourth embodiment according to the flowchart shown in FIG. 8. Note that the apparatus arrangement is the same as that of the first embodiment, and a description thereof will not be repeated.

In the flowchart of FIG. 8, a three-dimensional shape is detected using patterns A' to E' (not shown). In the fourth embodiment, the patterns A' to C' are used to identify optical cutting positions, and the patterns D' and E' are used to define the optical cutting positions. On the patterns D' and E', bright and dark sections are alternately arranged, and the pattern E' is obtained by reversing the bright and dark sections of the pattern D'. For example, when the pattern D' is the same as the pattern D shown in FIG. 2, the pattern E' has a relation obtained by reversing white and black portions of the pattern D, as can be easily understood. Note that patterns used to detect intersection positions may include bright and dark sections having different line widths, or as two types of patterns used to detect intersection positions, those having different phases may be used, and the patterns to be used are not limited to those used in the fourth embodiment.

In step S801, a light amount upon projecting the patterns used to define the optical cutting positions is set.

In step S802, an image of an object to be measured is captured without irradiation of a projector unit to acquire an image capture result G0 of outside-light components alone.

In steps S803 to S806, an image capture operation of each of the patterns D' and E' used to define optical cutting positions is repeated five times to acquire image capture results G1(1) to G1(5) and G2(1) to G2(5). Note that G1( ) represents an image capture result of the pattern D', and G2( ) represents an image capture result of the pattern E'.

Then, in step S807, the disturbance light components G0 are subtracted from the image capture results G1(1) to G1(5) and G2(1) to G2(5) of the plurality of image capture operations, thus calculating results S1(1) to S1(5) and S2(1) to S2(5) in which the disturbance light components are removed.

In step S808, the results S1(1) to S1(5) and S2(1) to S2(5) calculated in step S807 are combined to calculate results S1t and S2t, and intersections are calculated from the results S1t and S2t.

When the results S1t and S2t are calculated as discretely sampled tone distributions, positions having the same tone points between tone points of the result S1t and tone points of the result S2t are defined as optical cutting positions.

By combining a plurality of image capture results in which disturbance light components are removed, the influence of shot noise and that of outside-light components with respect to a light intensity can be simultaneously reduced.

Since steps S808 to S811 are substantially the same as steps S606 to S609 in FIG. 6, a description thereof will not be repeated.

In the fourth embodiment, intersection positions are detected from two types of bright-dark patterns, and are defined as optical cutting positions. Alternatively, midpoints between neighboring intersection positions may be defined as optical cutting positions, and a method of defining optical cutting positions is not limited to that of this embodiment. In this embodiment, the number of times of image capture operations in projection/image capture operations of the pattern D' or E' is set to be five. However, the number of times of measurement can be 2 or more, and may be changed depending on the situation.

The method of defining optical cutting positions is not limited to that of projecting a binary pattern including bright and dark sections. For example, as disclosed in Japanese Patent Laid-Open Nos. 2004-77290 and 2004-226186, a method of defining optical cutting positions using a multi-valued pattern may be used.

As described above, according to the first to fourth embodiments, an exposure amount of a first pattern is set to be larger than that of patterns other than the first pattern, thus obtaining an image capture result in which shot noise is reduced in the image capture operation of the first pattern used to define optical cutting positions.

For example, when a phase shift method for projecting a waveform pattern such as a sine wave pattern a plurality of times while shifting a phase, as disclosed in Japanese Patent Laid-Open No. 2011-133327 or the like, is used, the present invention is applicable. For example, this is the case when a plurality of waveform patterns used in the phase shift method are used as first patterns, and the patterns A to C described in the first embodiment are used together as a larger depth decision method than a repetition density of these phase shift patterns. In this case, patterns which determine positions of triangulation calculations are phase shift patterns as the first patterns. Even in such case, an exposure amount of the first pattern is set to be larger than that of patterns other than the first pattern, thus obtaining an image capture result in which shot noise is reduced in the image capture operation of the first pattern used to define optical cutting positions. That is, the first pattern is not limited to that including bright and dark sections, and any other methods may be used as long as the pattern can determine positions of triangulation calculations. Even in this case, the advantages of the present invention will not be lost.

Also, by adjusting an exposure amount at an image capture timing using a light source luminance level of the projector unit 1, electric power at a projection timing can be suppressed for patterns other than the first pattern, that is, those used to identify optical cutting positions. Alternatively, by adjusting an exposure amount at an image capture timing using an exposure time of the image capture unit 8, a time required until projection/image capture operation of the first pattern and the remaining patterns are complete can be appropriately shortened, and a detection time until the three-dimensional shape measurement can be shortened. When an exposure amount of the first pattern is increased by calculating a plurality of image capture results, an image capture result in which the influence of shot noise is further reduced can be obtained. As a result, the optical cutting positions can be precisely defined. Furthermore, when an increase in exposure amount of the first pattern is calculated after outside-light components are subtracted from a plurality of image capture results, an image capture result in which outside-light components in an environment are removed and the influence of shot noise is reduced can be obtained. As a result, the optical cutting positions can be precisely calculated. Furthermore, as for an increase in exposure amount of the first pattern, by converting a plurality of image capture results into digital image data, data processing is facilitated.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-271775, filed Dec. 12, 2012, which is hereby incorporated by reference herein in its entirety.

What is claimed is:

1. A measurement apparatus comprising:
a projection unit configured to sequentially project, onto an object, a plurality of patterns, wherein a width of each of bright and dark sections of a first pattern of the plurality of patterns is different from a width of each of bright and dark sections of a second pattern of the plurality of patterns;
a capturing unit configured to sequentially capture, by using an image capturing device, a plurality of images of the object onto which the plurality of patterns are sequentially projected; and
a processor and a memory that cooperate to act as units comprising:
(1) a measurement unit configured to
(a) binarize the plurality of images, wherein the binarization specifies positions to which a principle of triangulation is applied, and
(b) measure a three-dimensional shape of the object based on the specified positions; and
(2) a control unit configured to control the projection unit or the capturing unit such that an exposure amount on the image capturing device when capturing a first image which corresponds to the first pattern, the first pattern being used to define a position, is larger than an exposure amount on the image capturing device when capturing a second image which corresponds to the second pattern,
wherein the measurement unit defines the position in the first image, and utilizes the defined position in the first image to specify, from the second image captured by the image capturing device whose exposure amount is smaller than the exposure amount on the image capturing device when capturing the first image, a position of the positions to which the principle of triangulation is applied.

2. The measurement apparatus according to claim 1, wherein the control unit is configured to control the projection unit such that a light amount of the first pattern is larger than a light amount of the second pattern.

3. The measurement apparatus according to claim 1, wherein the control unit is configured to control the capturing unit such that an image capture time required for obtaining the image of the first pattern is longer than an image capture time required for obtaining the image of the second pattern.

4. The measurement apparatus according to claim 1, wherein the control unit is configured to control the capturing unit to perform a plurality of image capture operations of the object such that the number of image capture operations of the image of the first pattern is larger than the number of image capture operations of the image of the second pattern.

5. The measurement apparatus according to claim 4, wherein the control unit is configured to combine a plurality of images obtained by subtracting outside-light components from a plurality of images obtained by controlling the capturing unit to perform the plurality of image capture operations of the object onto which the first pattern is projected.

6. The measurement apparatus according to claim 1, wherein the first pattern is a pattern having the narrowest width of the plurality of patterns.

7. The measurement apparatus according to claim 1, wherein the plurality of patterns includes patterns obtained by reversing bright sections and dark sections of the first pattern.

8. The measurement apparatus according to claim 1, wherein the measurement unit is configured to measure the three-dimensional shape of the object in combination with a coded pattern light and a phase shift method.

9. The measurement apparatus according to claim 1, wherein the first image corresponds to the bright section of the first pattern, and the second image corresponds to the bright section of the second pattern.

10. A measurement method comprising:
sequentially projecting, by a projection unit, onto an object, a plurality of patterns, wherein a width of each of bright and dark sections of a first pattern of the plurality of patterns is different from a width of each of bright and dark sections of a second pattern of the plurality of patterns;
sequentially capturing, by using an image capturing device, a plurality of images of the object onto which the plurality of patterns are sequentially projected;
binarizing the plurality of images, wherein the binarizing specifies positions to which a principle of triangulation is applied; and
measuring a three-dimensional shape of the object based on the specified positions,
wherein an exposure amount on the image capturing device when capturing a first image which corresponds to the first pattern, the first pattern being used to define a position, is larger than an exposure amount on the image capturing device when capturing a second image which corresponds to the second pattern,
wherein the position is defined in the first image, and the defined position in the first image is used to specify, from the second image captured by the image capturing device whose exposure amount is smaller than the exposure amount on the image capturing device when capturing the first image, a position of the positions to which the principle of triangulation is applied.

11. The measurement method according to claim 10, wherein the projection unit is controlled such that a light amount of the first pattern is larger than a light amount of the second pattern.

12. The measurement method according to claim 10, wherein the image capturing device is controlled such that an image capture time required for obtaining the image of the first pattern is longer than an image capture time required for obtaining the image of the second pattern.

13. The measurement method according to claim 10, wherein, in the sequential capturing, a plurality of image capture operations of the object are performed such that the number of image capture operations of the image of the first pattern is larger than the number of image capture operations of the image of the second pattern.

14. The measurement method according to claim 10, further comprising:
combining a plurality of images obtained by subtracting outside-light components from a plurality of images obtained by controlling the capturing unit to perform the plurality of image capture operations of the object onto which the first pattern is projected.

15. A non-transitory computer-readable medium storing a program for causing a computer to execute a measurement method, the measurement method comprising:
sequentially projecting, by a projection unit, onto an object, a plurality of patterns, wherein a width of each of bright and dark sections of a first pattern of the plurality of patterns is different from a width of each of bright and dark sections of a second pattern of the plurality of patterns;
sequentially capturing, by using an image capturing device, a plurality of images of the object onto which the plurality of patterns are sequentially projected;
binarizing the plurality of images, wherein the binarizing specifies positions to which a principle of triangulation is applied; and
measuring a three-dimensional shape of the object based on the specified positions,
wherein an exposure amount on the image capturing device when capturing a first image which corresponds to the first pattern, the first pattern being used to define a position, is larger than an exposure amount on the image capturing device when capturing a second image which corresponds to the second pattern,
wherein the position is defined in the first image, and the defined position in the first image is used to specify, from the second image captured by the image capturing device whose exposure amount is smaller than the exposure amount on the image capturing device when capturing the first image, a position of the positions to which the principle of triangulation is applied.

* * * * *